United States Patent
Ahn (10) Patent No.: US 10,073,485 B2
(45) Date of Patent: Sep. 11, 2018

(54) METHOD FOR COMPENSATING INSTANTANEOUS POWER FAILURE IN MEDIUM VOLTAGE INVERTER AND MEDIUM VOLTAGE INVERTER SYSTEM USING THE SAME

(71) Applicant: LSIS CO., LTD., Gyeonggi-do (KR)

(72) Inventor: Sung-Guk Ahn, Seoul (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 296 days.

(21) Appl. No.: 14/997,982

(22) Filed: Jan. 18, 2016

(65) Prior Publication Data
US 2016/0209862 A1    Jul. 21, 2016

(30) Foreign Application Priority Data

Jan. 19, 2015 (KR) .......................... 10-2015-0008915

(51) Int. Cl.
*H02J 1/10* (2006.01)
*H02J 3/38* (2006.01)
(Continued)

(52) U.S. Cl.
CPC .............. *G05F 5/00* (2013.01); *H02M 1/32* (2013.01); *H02M 7/49* (2013.01); *H02P 1/029* (2013.01);
(Continued)

(58) Field of Classification Search
CPC ............ G05F 5/00; H02P 23/07; H02P 1/029; H02M 7/49; H02M 1/32; H02M 2007/4835; Y02P 80/15
(Continued)

(56) References Cited

U.S. PATENT DOCUMENTS

| 2006/0119311 A1 | 6/2006 | Lee |
| 2013/0076285 A1* | 3/2013 | Choi ..................... H02P 29/022 |
| | | 318/453 |
| 2013/0154536 A1 | 6/2013 | Park |

FOREIGN PATENT DOCUMENTS

| CN | 102233304 A | 11/2011 |
| EP | 2549637 A2 | 1/2013 |

(Continued)

OTHER PUBLICATIONS

Japanese Office Action dated Jan. 31, 2017 in corresponding the counterpart Japanese patent application No. 2016-008211.
(Continued)

*Primary Examiner* — Richard Tan
(74) *Attorney, Agent, or Firm* — K&L Gates LLP (57) ABSTRACT

According to an embodiment, a method for compensating instantaneous power failure includes determining whether an input voltage of a plurality of power cells is less than or equal to a first threshold voltage, decreasing, when the input voltage is less than or equal to the first threshold voltage, an output frequency of the inverter, determining whether a voltage of a direct current (DC) link is greater than or equal to a second threshold voltage, and increasing, when the voltage of the DC link is greater than or equal to the second threshold voltage, the output frequency of the inverter. Overvoltage trip may be prevented at the power restoration time and overcurrent trip caused by increase in the slip frequency may be prevented. Thereby, reliability of a medium inverter may be enhanced, and a continuous operation time increased compared to the conventional cases may be ensured.

6 Claims, 6 Drawing Sheets

(51) Int. Cl.
  *G05F 5/00*   (2006.01)
  *H02M 1/32*   (2007.01)
  *H02M 7/49*   (2007.01)
  *H02P 1/02*   (2006.01)
  *H02P 23/07*  (2016.01)
  *H02M 7/483*  (2007.01)

(52) U.S. Cl.
  CPC ..... *H02P 23/07* (2016.02); *H02M 2007/4835* (2013.01); *Y02P 80/15* (2015.11)

(58) Field of Classification Search
  USPC .......................................................... 307/52
  See application file for complete search history.

(56) References Cited

FOREIGN PATENT DOCUMENTS

| | | |
|---|---|---|
| JP | S59-14393 A | 1/1984 |
| JP | H02-184293 A | 7/1990 |
| JP | 2013-27310 A | 2/2013 |
| JP | 2013-74792 A | 4/2013 |
| JP | 2013-126371 A | 6/2013 |
| KR | 1020060064336 A | 6/2006 |
| KR | 1020110123164 A | 11/2011 |
| KR | 101236621 B1 | 2/2013 |
| KR | 1020130033067 A | 4/2013 |

OTHER PUBLICATIONS

European Search Report dated Oct. 11, 2016 corresponding to application No. 15203101.9-1809.

\* cited by examiner

METHOD FOR COMPENSATING INSTANTANEOUS POWER FAILURE IN MEDIUM VOLTAGE INVERTER AND MEDIUM VOLTAGE INVERTER SYSTEM USING THE SAME

CROSS-REFERENCE TO RELATED APPLICATIONS

This application claims the benefit of Korean Patent Application No. 10-2015-0008915 filed on 19 Jan. 2015, in the Korean Intellectual Property Office, the disclosure of which is incorporated herein by reference in its entirety.

BACKGROUND

Technical Field

Embodiments of the present disclosure relate to a method for compensating instantaneous power failure in a medium voltage inverter and, more particularly, to a method for compensating instantaneous power failure for a cascaded H-bridge (CHB) type high-capacity medium voltage inverter and a voltage inverter system using the same.

Description of the Related Art

In general, when input power failure occurs, an inverter interrupts pulse width modulation (PWM) output within a few milliseconds. In this case, a long time is taken for a load having high inertia such as a motor to restore power as the load is accelerated. If a long time is taken to recover power, this may be a great loss for industries. Accordingly, a technology for compensating instantaneous power failure in the inverter is applied in places where stopping the inverter can result in considerable damage.

Figure 1:
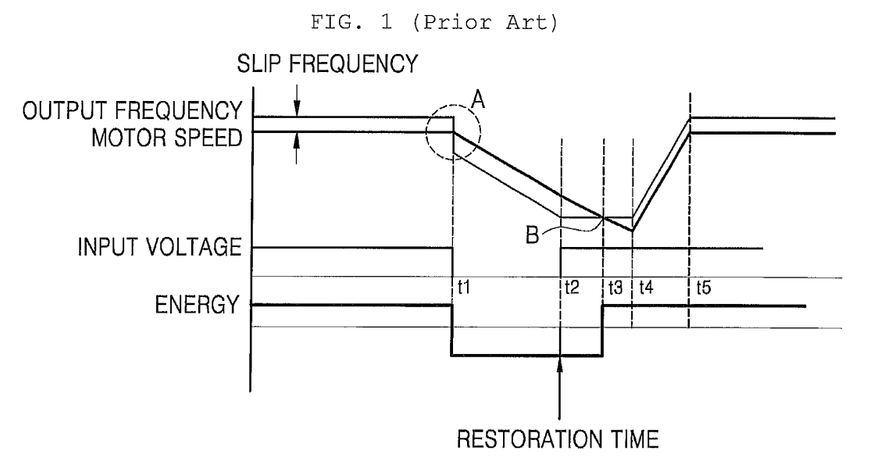
FIG. 1 is a graph illustrating a conventional method for compensating instantaneous power failure.

FIG. 1 is a graph illustrating a conventional method for compensating instantaneous power failure.

As shown in FIG. 1, when the input voltage is reduced to a voltage less than or equal to a first threshold voltage at t1, the output frequency is reduced by a predetermined value. Thereafter, the output frequency is reduced at a predetermined deceleration rate until t2, which is the restoration time. By reducing the output frequency as described above, regenerative energy for controlling a power failure period at the initial stage of power failure may be obtained. According to the conventional method for compensating instantaneous power failure described above, the power failure period is coped with by converting kinetic energy stored in a load into electrical energy. Thereby instantaneous power failure lasting for more than 16 ms may be coped with, which is not possible with the conventional medium voltage inverter employing the CHB technique.

However, the conventional technology for compensating instantaneous power failure in an inverter as illustrated in FIG. 1 has the following problems.

First, according to the conventional technology for compensating instantaneous power failure in an inverter, regenerative energy from the motor and power are simultaneously supplied at the power restoration time t2. Thereby, the voltage of a DC link increases, resulting in overvoltage trip.

Second, the actual speed of the motor does not vary linearly with the motor capacity or load. There is, if the slip frequency increases beyond a certain value due to nonlinearity of the motor speed, output current increases, thereby resulting in overcurrent trip.

SUMMARY

An object of some embodiments of the present disclosure is to provide a method for compensating instantaneous power failure to enhance reliability of a medium inverter and ensure continuous operation time increased over conventional cases by preventing overvoltage trip at the power restoration time and overcurrent trip caused by increase in slip frequency through a control operation performed such that the output frequency of the inverter increases when the input voltage is greater than or equal to a first threshold voltage and decreases when the output current of the motor is greater than or equal to a threshold current, and a medium voltage system using the same.

It should be noted that objects of the embodiments of the present disclosure are not limited to the aforementioned object, and other objects of the present disclosure will be apparent to those skilled in the art from the following descriptions. In addition, it will be appreciated that the objects and advantages of the present disclosure can be implemented by means recited in the appended claims and the combination thereof.

According to an embodiment of the present disclosure, there is provided a method for compensating instantaneous power failure in an inverter including a plurality of power cells, the method including determining whether an input voltage of the plurality of power cells is less than or equal to a first threshold voltage, decreasing, when the input voltage is less than or equal to the first threshold voltage, an output frequency of the inverter, determining whether a voltage of a direct current (DC) link is greater than or equal to a second threshold voltage, and increasing, when the voltage of the DC link is greater than or equal to the second threshold voltage, the output frequency of the inverter.

According to an embodiment of the present disclosure described above, overvoltage trip may be prevented at the power restoration time and overcurrent trip caused by increase in the slip frequency may be prevented. Thereby, reliability of a medium inverter may be enhanced, and a continuous operation time increased compared to the conventional cases may be ensured.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Objects, features and advantages of the present disclosure will become apparent from the descriptions of exemplary embodiments herein below with reference to the accompanying drawings. Thereby, those skilled in the art may easily practice the technical spirit of the present disclosure. In the following detailed description of the embodiments of the present disclosure, well-known technologies pertinent to the present disclosure have not been described in detail so as not to unnecessarily obscure aspects of the present disclosure. Reference will now be made in detail to the embodiments of the disclosure, examples of which are illustrated in the accompanying drawings. The use of the same reference label in different drawings indicates the same or like components.

An object of some embodiments of the present disclosure is to provide a method for compensating instantaneous power failure to enhance reliability of a medium voltage inverter and ensuring that the operation time is increased compared to the conventional cases by preventing overvoltage trip caused by regenerative energy according to decrease in output frequency of the inverter and the restored input voltage at the power restoration time and overcurrent trip resulting from increase in slip frequency, and the medium voltage inverter system using the same.

Figure 2:
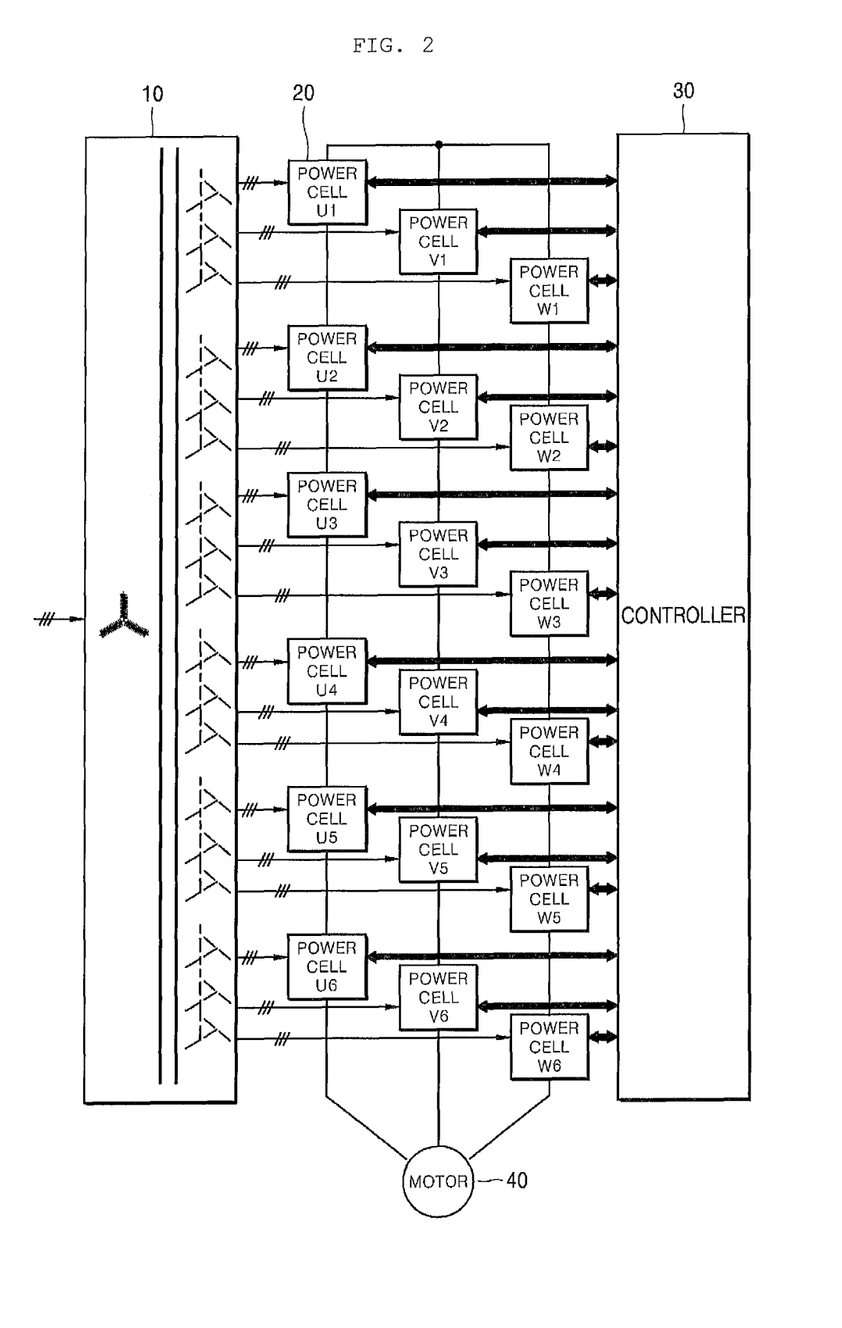
FIG. 2 is a block diagram illustrating a CHB type medium inverter according to an embodiment of the present disclosure.

FIG. 2 is a block diagram illustrating a CHB type medium inverter according to an embodiment of the present disclosure.

Referring to FIG. 2, a medium voltage inverter according to the embodiment may be implemented in as a CHB type inverter and include a phase shift transformer 10, power cells 20, a controller 30 and a motor 40.

The phase shift transformer 10 serves to supply input power to a plurality of power cells 20 by shifting the phase of the input power. For example, the phase shift transformer 10 may include a primary winding having a three-phase Y connection and a secondary winding having a predetermined phase difference compared to the primary winding. Herein, the structure of the secondary winding may depend on the number of the power cells 20. The phase shift transformer 10 and is well known in the art and thus a detailed description thereof has not been given in the following description.

The controller 30 may be connected to a plurality of power cells over a network. Preferably, the network may be configured as a control area network (CAN). However, embodiments of the present disclosure are not limited thereto. It is apparent to those skilled in the art that a network known in the art can be applied. In addition, the controller 30 compensates instantaneous power failure by controlling the power cells 20 through communication with the power cells 20. Relevant details will be described later with reference to the accompanying drawings.

The power cells 20 constitute a single phase voltage supplied to the motor 30 by being connected in series as a single phase inverter. That is, the entirety of the power cells 20 may operate as a three-phase inverter capable of obtaining a medium voltage output. Hereinafter, description will be given based on an exemplary single phase inverter consisting of 18 power cells 20. However, it is apparent to those skilled in the art that configuration of the power cells is not limited thereto. As the number of the power cells 20 increases, the power supplied to the motor 40 may increase.

The power cell 20 may communicate with the controller 30 over a network and be controlled by the controller 30 to compensate instantaneous power failure. To this end, the power cell 20 may include a power cell controller 24 for communicating with the controller 30.

Figure 3:
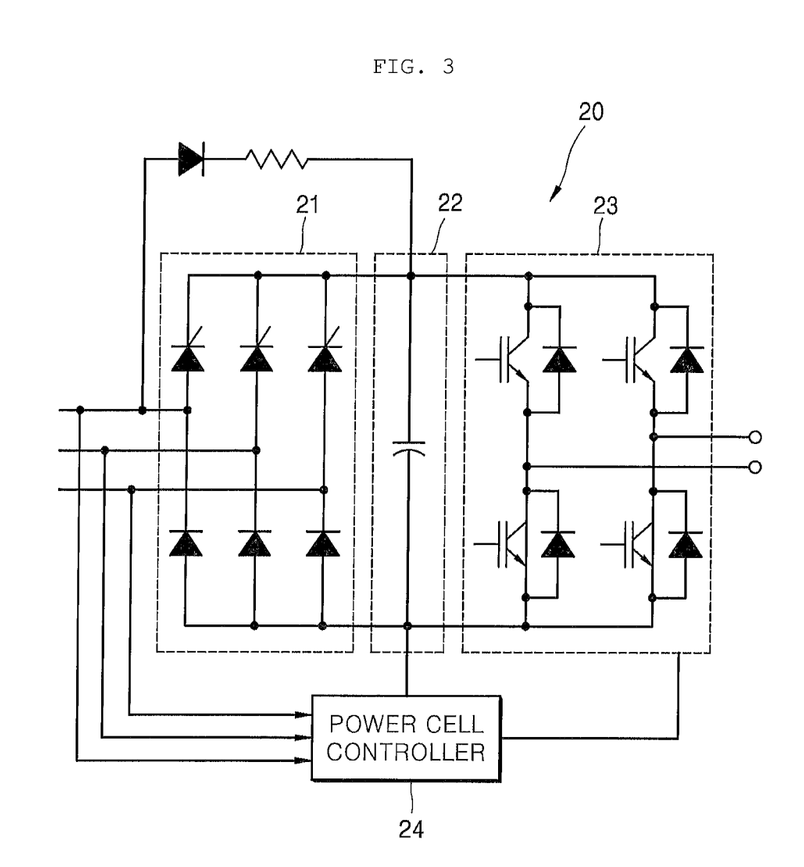
FIG. 3 is a diagram illustrating a power cell according to an embodiment of the present disclosure.

FIG. 3 is a diagram illustrating a power cell according to an embodiment of the present disclosure. For example, each of the power cells shown in FIG. 2 may be configured as shown in FIG. 3. The power cells 20 may be identically configured.

Referring to FIG. 3, the power cell 20 according to an embodiment of the present disclosure may include a rectification unit 21, a DC link unit 22, an inverter unit 23, and a power cell controller 24.

The rectification unit 21 serves to convert a three-phase AC input voltage into a direct current (DC) voltage. The DC link unit 22 serves to store the voltage converted into the DC voltage by the rectification unit 21. Herein, the DC link unit 22 may convert a rectified waveform into a stable DC through a smoothing capacitor. In the following description, the input voltage means a voltage supplied to the DC link unit 22 through the rectification unit 21, and the voltage of the DC link means a voltage stored in the DC link unit 22.

The inverter unit 23 serves to switch the rectified DC to generate an AC. The inverter unit 23 may generate an AC by switching a transistor according to the output frequency of the power cell controller 24. Thereby, the inverter unit 23 may drive the motor 40. Herein, the transistor may be an insulated gate bipolar transistor (IGBT).

Operations of the rectification unit 21, the DC link unit 22 and the inverter 20 are well known to those skilled in the art, and therefore a detailed description thereof will not be given.

The power cell controller 24 serves to transmit the voltage information about the DC link unit 22 to the controller 30 and to deliver the output frequency of the inverter 23 under control of the controller 30. Specifically, the power cell controller 24 may adjust the output frequency and the voltage of the inverter 23 according to control of the switching operation by the controller 30. That is, the power to control a 24 serves to control the power cells according to a control signal of the controller 30.

With the configurations as described above, the method for compensating instantaneous power failure according to an embodiment of the present disclosure is implemented in the following procedure.

The power cell controller 24 monitors an input voltage applied to the power cells 20. If the input voltage applied to the power cells 20 is less than or equal to a first predetermined threshold voltage, the power cell controller 24 may determine that instantaneous power failure has occurred. In addition, the power cell controller 24 may deliver the voltage information to the controller 30. Herein, the instantaneous power failure may include a typical power failure caused by interruption of the supplied power and an instantaneous power drop.

According to the conventional medium voltage inverter, operation of the inverter is stopped when an input voltage less than or equal to the first threshold voltage is applied to the power cell 20. This is because the capacity of the motor 40, which is a load, is generally greater than the capacity of the capacitor of the DC link unit 22 of the power cell 20, and thus low-voltage trip occurs before the control loop is performed.

With a method for compensating instantaneous power failure according to an embodiment of the present disclosure, when a voltage less than or equal to the first threshold voltage is applied and thus instantaneous power failure occurs, the output frequency of the inverter 23 is immediately reduced in order to prevent the low-voltage trip. By reducing the output frequency as described above, regenerative energy for controlling the power failure section at the initial stage of power failure may be obtained. Preferably, the output frequency is reduced such that the output frequency is lower than the frequency corresponding to the actual speed of the motor 40.

Subsequently, the output frequency of the inverter 23 is reduced such that a predetermined deceleration gradient suitable for the load or the motor 40 is obtained. The speed of the motor may be lower than the output frequency from the inverter unit 23 by a slip frequency.

The power cell controller 24 may monitor and transmit the voltage information about the DC link unit 22 to the controller in preparation for increase in voltage according to the regenerative energy. Thereby, when the voltage of the DC link unit 22 increases, the output frequency may be increased by a value corresponding to a voltage increase to consume the regenerative energy. Thereby, overvoltage trip according to increase in voltage of the DC link unit 22 may be prevented.

Next, when the input voltage beyond the power failure section is restored, the controller may maintain the output frequency obtained at the restoration time. This is intended to prevent overcurrent trip, which is caused by excessive slip occurring due to high inertia of the motor 40 when the output frequency is increased.

The controller 30 may maintain the output frequency obtained at the restoration time for a predetermined time such that the output current of the inverter in the restoration mode does not exceed a threshold current. Herein, the time for which the output frequency is maintained may be predetermined according to load to the motor 40.

Lastly, the control 30 increases the output frequency according to a predetermined acceleration gradient such that the motor 40 restores the speed before the instantaneous power failure. Herein, the acceleration gradient may be predetermined by the user or may be determined in consideration of the load amount. Thereby, the speed of the motor 40 may increase to a speed before the input instantaneous power failure as the output frequency increases.

The actual speed of the motor does not vary linearly according to the capacity of the motor or the load amount. That is, when the slip frequency increases beyond a certain value according to nonlinearity of the speed of the motor, the output current may increase, resulting in overcurrent trip.

In addition, according to the method for compensating instantaneous power failure in the inverter described above, the regenerative energy from the motor and power may be supplied to the DC link unit 22 simultaneously at the restoration time. Thereby, the voltage of the DC link may increase, resulting in overvoltage trip.

Figure 4:
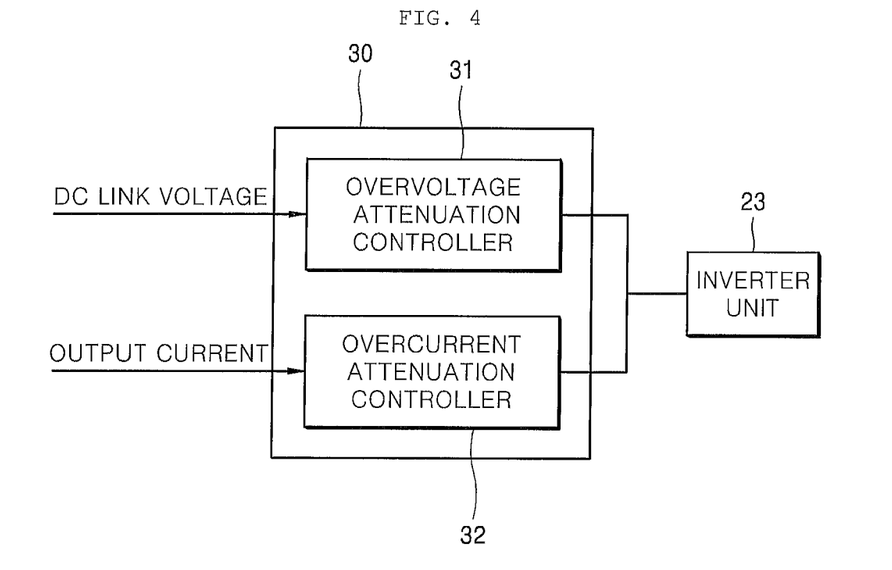
FIG. 4 is a block diagram illustrating a controller according to an embodiment of the present disclosure.

FIG. 4 is a block diagram illustrating a controller according to an embodiment of the present disclosure. Referring to FIG. 4, the controller 30 may include an overvoltage attenuation controller 31 and an overcurrent attenuation controller 32.

The overvoltage attenuation controller 31 monitors the voltage of the DC link unit 22. If the input voltage of the DC link unit 22 is greater than or equal to a first threshold voltage, the overvoltage attenuation controller 31 increases the output frequency by a predetermined value. To this end, the overvoltage attenuation controller 31 may be connected to the inverter unit 23. Preferably, the overvoltage attenuation controller 31 may monitor increase in voltage of the DC link unit 22 resulting from the regenerative energy and the restored input voltage, at the time at which the input voltage of the plurality of power cells is restored. In addition, the overvoltage attenuation controller 31 may increase the output frequency by an increment of the voltage. Specifically, the overvoltage attenuation controller 31 may determine whether the input voltage of the DC link units 22 of the plurality of power cells is greater than or equal to a second threshold voltage. If the input voltage is greater than or equal to the second threshold voltage, the overvoltage attenuation controller 31 may increase the output frequency of the inverter.

The overcurrent attenuation controller 32 monitors the output current. If the output current is greater than or equal to a threshold current, the overcurrent attenuation controller 32 decreases the output frequency by a predetermined value. Preferably, the overcurrent attenuation controller 32 may monitor the output current according to increase in voltage of the DC link unit 22 and reduce the output frequency of the plurality of power cells by a predetermined value.

Figure 5:
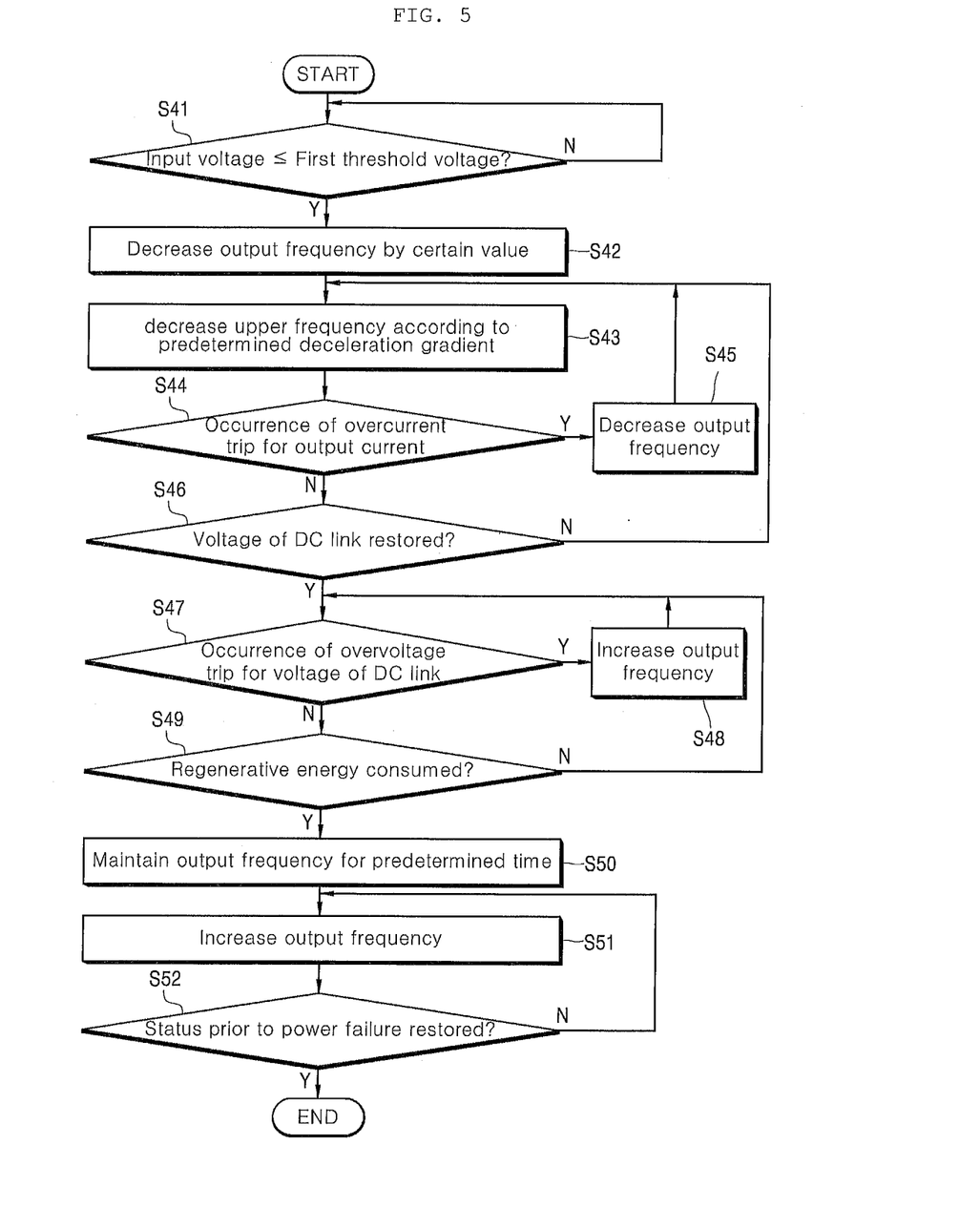
FIG. 5 is a flowchart illustrating a method for compensating instantaneous power failure according to an embodiment of the present disclosure.

FIG. 5 is a flowchart illustrating a method for compensating instantaneous power failure according to an embodiment of the present disclosure. As described above, the method for compensating instantaneous power failure of FIG. 5 may be implemented under control of the controller 30.

Referring to FIG. 5, the power cell controller 24 monitors an input voltage applied to the power cells 20. If the input voltage applied to the power cell 20 is less than or equal to a first predetermined threshold voltage (S41), the power cell controller 24 may determine that power failure has occurred and signal the power failure to the controller 30.

In order to prevent the low-voltage trip, which occurs when the capacity of the motor 40 is higher than the capacity of the capacitor of the DC link unit 22 of the power cell 20, the controller reduces the output frequency by a certain value when instantaneous power failure occurs (S42). As the output frequency decreases, regenerative energy for controlling the power failure section at the initial stage of power failure may be obtained.

Next, the controller 30 reduces the output frequency of the inverter unit 23 such that a predetermined deceleration gradient is obtained (S43). The actual speed of the motor does not vary linearly according to the capacity of the motor or the load amount. Specifically, when the slip frequency increases beyond a certain value according to nonlinearity of the speed of the motor, the output current may increase, resulting in overcurrent trip. If the output current increases beyond a threshold current and thus overcurrent trip occurs (S44), the overcurrent attenuation controller 32 decreases the upper frequency by a predetermined value (S45).

Next, when the power out of the power failure section is restored (S46), the overvoltage attenuation controller 31 monitors the voltage of the DC link unit 22 and determines whether overvoltage trip has occurred (S47). That is, the overvoltage attenuation controller 31 monitors increase in voltage of the DC link unit 22 resulting from the regenerative energy and the restored input voltage at the time the input voltage is restored. If the overvoltage trip occurs, the overvoltage attenuation control 31 increases the upper frequency by an increment of the voltage (S48).

If overvoltage trip has not occurred as a result of monitoring of the voltage of the DC link unit 22, it is determined whether the regenerative energy has been consumed (S49). If all the regenerative energy is consumed, the DC link unit 20 may be maintained at a voltage level maintained before the instantaneous power failure.

Next, once all the regenerative energy is consumed and the voltage increment resulting from the regenerative energy is eliminated, the controller 30 maintains the output frequency obtained at the restoration time for a predetermined time (S47). Herein, the predetermined time for which the output frequency is maintained may be predetermined in consideration of the load amount applied to the motor 40.

Lastly, the controller 30 increases the output frequency according to a predetermined acceleration gradient such that the motor 40 returns to the speed prior to the instantaneous power failure (S51 and S52). Thereby, the speed of the motor 40 may increase up to a speed corresponding to the output frequency prior to the instantaneous power failure as the output frequency increases.

Figure 6:
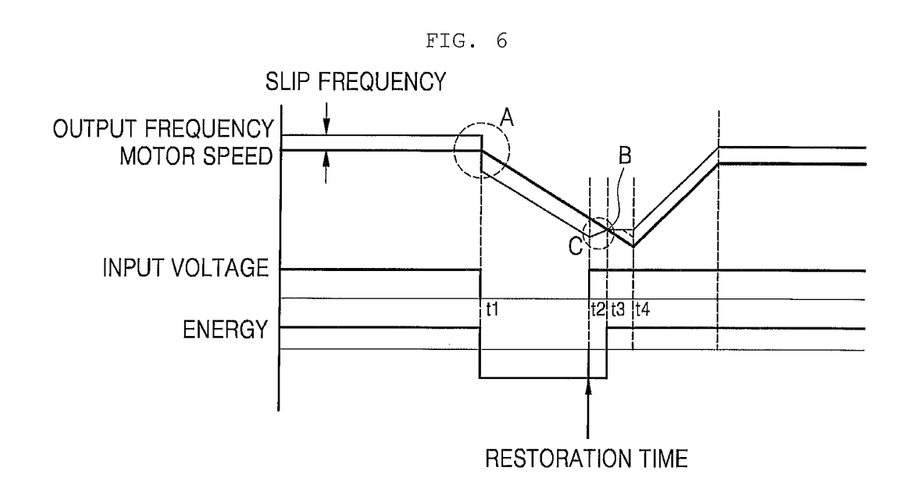
FIG. 6 is a graph illustrating a method for compensating instantaneous power failure according to an embodiment of the present disclosure.

FIG. 6 is a graph illustrating a method for compensating instantaneous power failure according to an embodiment of the present disclosure. FIG. 6 exemplarily shows an output frequency, a motor speed, an input voltage and motor energy at the time power failure occurs.

Referring to FIG. 6, an input voltage maintained at a certain level is applied until t1. Herein, the input voltage, which is generally an AC voltage, is represented by the effective value thereof. In FIG. 6, the difference between the output frequency of the inverter unit 23 and the frequency corresponding to the actual speed of the motor 40 is called a slip frequency.

When the input voltage decreases down below a first threshold voltage at t1, the controller 30 decreases the output frequency by a predetermined value (A), and subsequently decreases the output frequency according to a predetermined deceleration gradient. The output frequency may be reduced until t2, at which the input voltage is restored.

The overvoltage attenuation controller 31 monitors increase in voltage of the DC link unit resulting from the regenerative energy and the restored input voltage and increases the output frequency by the increment of the voltage at t2, at which the input voltage is restored (C). More specifically, the voltage of the DC link unit increases according to the regenerative energy and the restored input voltage at t2 when the input voltage is restored. If the voltage of the DC link unit increases beyond an overvoltage level, overvoltage trip may occur. In addition, increase in voltage of the DC link unit may lead to instantaneous increase in output current. Thereby, overcurrent trip may occur.

The controller 30 may monitor the input voltage and increase in voltage of the DC link unit through the overvoltage attenuation the controller 31 and the overcurrent tilting user controller 32, thereby preventing the overvoltage trip and the overcurrent trip.

In order to prevent increase in voltage of the DC link unit at the restoration time t2, it is important to maintain the voltage at a normal level by consuming the regenerative energy. That is, the overvoltage attenuation controller 31 may monitor the voltage of the DC link unit and increase the output frequency to consume the regenerative energy. Herein, the output frequency may be increased according to a predetermined gradient. In addition, the overcurrent attenuation controller 32 monitors the output current and adjusts the output frequency to prevent overcurrent trip.

Thereby, when all the regenerative energy is consumed, the voltage of the DC link unit is maintained at the normal level. In addition, when the voltage increment resulting from the regenerative energy is eliminated, the output frequency is maintained for a predetermined time.

Lastly, the controller 30 may increase the output frequency up to a frequency prior to instantaneous power failure according to a predetermined acceleration gradient.

According to embodiments of the present disclosure, the overvoltage trip occurring at the restoration time of the power and the overcurrent trip resulting from increase in the slip frequency may be prevented. Thereby, reliability of a medium voltage inverter may be enhanced and a continuous operation time increased compared to the conventional cases may be ensured.

Those skilled in the art will appreciate that various substitutions, modifications and variations can be made in the present disclosure without departing from the spirit of the present disclosure. Therefore, those skilled in the art will appreciate that the present disclosure is not limited to the exemplary embodiments described above and the accompanying drawings. While these and other embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. Additional system components can be utilized, and disclosed system components can be combined or omitted. The actual steps taken in the disclosed processes, such as the process illustrated in FIG. 5, may differ from those shown in the figures. Depending on the embodiment, certain of the steps described above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A method for compensating instantaneous power failure in an inverter including a plurality of power cells, the method comprising:
   determining whether an input voltage of the plurality of power cells is less than or equal to a first threshold voltage;
   decreasing, when the input voltage is less than or equal to the first threshold voltage, an output frequency of the inverter;
   determining whether a voltage of a direct current (DC) link is greater than or equal to a second threshold voltage; and
   increasing, when the voltage of the DC link is greater than or equal to the second threshold voltage, the output frequency of the inverter,
   wherein the increasing of the output frequency of the inverter comprises monitoring change of the voltage of the DC link resulting from regenerative energy supplied from a load to the plurality of power cells and a restored input voltage and increasing the output frequency by an increment of the voltage of the DC link at a time when the input voltage of the plurality of power cells greater than or equal to the first threshold voltage is restored,
   the method further comprising: maintaining, when the increment of the voltage of the DC link resulting from the regenerative energy is eliminated, the output frequency of the inverter for a predetermined time,
   wherein the maintaining is performed after the monitoring of the change and the increasing of the output frequency of the inverter.

2. The method according to claim 1, further comprising:
decreasing, when an output current is greater than or equal to a threshold current, an output frequency of the plurality of power cells.

3. The method according to claim 1, wherein a gradient of the output frequency of the inverter is predetermined according to a load amount at the time when the input voltage of the plurality of power cells greater than or equal to the second threshold voltage is restored.

4. The method according to claim 2, wherein decreasing the output frequency of the plurality of the power cells comprises:
monitoring the output current according to increase in the voltage of the DC link and decreasing the output frequency of the plurality of power cells by a predetermined value.

5. The method according to claim 1, further comprising:
increasing the output frequency of the inverter according to a predetermined acceleration gradient,
wherein the increasing of the output frequency of the inverter according to the predetermined acceleration gradient is performed after the maintaining of the output frequency for the predetermined time.

6. The method according to claim 5, wherein the increasing of the output frequency of the inverter according to the predetermined acceleration gradient comprises:
increasing the output frequency of the inverter up to a frequency prior to the instantaneous power failure.

\* \* \* \* \*